US012654498B2

(12) United States Patent
Takezawa

(10) Patent No.: US 12,654,498 B2
(45) Date of Patent: Jun. 16, 2026

(54) TIRE PHYSICAL INFORMATION ESTIMATION SYSTEM AND ARITHMETIC OPERATION MODEL GENERATION SYSTEM

(71) Applicant: TOYO TIRE CORPORATION, Itami (JP)

(72) Inventor: Hironori Takezawa, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 647 days.

(21) Appl. No.: 17/967,611

(22) Filed: Oct. 17, 2022

(65) Prior Publication Data

US 2023/0123850 A1     Apr. 20, 2023

(30) Foreign Application Priority Data

Oct. 19, 2021     (JP) ................................. 2021-170879

(51) Int. Cl.
      *B60C 23/06*          (2006.01)
      *B60C 23/04*          (2006.01)
                   (Continued)

(52) U.S. Cl.
      CPC ........ B60C 23/064 (2013.01); B60C 23/0447 (2013.01); B60C 23/0488 (2013.01);
                   (Continued)

(58) Field of Classification Search
      CPC ............ B60C 2200/04; B60C 23/0447; B60C 23/0488; B60C 23/064; B60C 23/20;
                   (Continued)

(56) References Cited

U.S. PATENT DOCUMENTS

2015/0210286 A1 *  7/2015  Hanatsuka .......... B60W 40/068
                                              701/34.4
2019/0156178 A1 *  5/2019  Thornton ............. G06N 3/0442
                   (Continued)

FOREIGN PATENT DOCUMENTS

CN          111272334 A      6/2020
JP          07-105163 A      4/1995
                   (Continued)

OTHER PUBLICATIONS

Yang, Zhong CN11272334A Translation Jun. 12, 2020 (Year: 2020).*
                   (Continued)

Primary Examiner — Yoshihisa Ishizuka
(74) *Attorney, Agent, or Firm* — MUNCY, GEISSLER, OLDS & LOWE, P.C.

(57)          ABSTRACT

A tire physical information estimation system includes a physical information estimation unit and a data acquisition unit. The physical information estimation unit that includes a learning type arithmetic operation model including an input layer through an output layer and estimates tire physical information produced in association with movement of a tire. The data acquisition unit acquires input data input to the input layer. The arithmetic operation model includes a feature extraction unit that performs a convolution operation in an operation halfway between the input layer and the output layer, the arithmetic operation model outputting normalized tire physical information in at least two axial directions from the output layer.

5 Claims, 13 Drawing Sheets

(51) Int. Cl.

| | | |
|---|---|---|
| *B60C 23/20* | (2006.01) | |
| *G06N 3/045* | (2023.01) | |
| *G06N 3/08* | (2023.01) | |

(52) U.S. Cl.
  CPC ............. *B60C 23/20* (2013.01); *G06N 3/045* (2023.01); *G06N 3/08* (2013.01); *B60C 2200/04* (2013.01)

(58) Field of Classification Search
  CPC ...... B60T 2270/86; B60T 8/172; B60T 8/174; B60W 40/12; G06N 3/045; G06N 3/0464; G06N 3/08; G06N 3/09
  See application file for complete search history.

(56) References Cited

U.S. PATENT DOCUMENTS

| | | | | |
|---|---|---|---|---|
| 2020/0065675 | A1* | 2/2020 | Sundaram | ........... G06F 18/2155 |
| 2020/0207361 | A1* | 7/2020 | Ishigami | ............... B60W 50/00 |
| 2021/0134082 | A1* | 5/2021 | Wilgar | ................. B60T 8/1725 |
| 2022/0274452 | A1 | 9/2022 | Hasegawa | |

FOREIGN PATENT DOCUMENTS

| | | |
|---|---|---|
| JP | 2019055644 A | 4/2019 |
| JP | 202146080 A | 3/2021 |
| JP | 2021089163 A | 6/2021 |

OTHER PUBLICATIONS

Nan Xu et al: "Tire Force Estimation in Intelligent Tires Using Machine Learning", arxiv.org, Cornell University Library, 201 Olin Library Cornell University Ithaca, NY 14853, Dec. 11, 2020 (Dec. 11, 2020), pp. 1-10.
Office Action issued for corresponding Japanese Patent Application No. 2021-170879 dated May 7, 2025; pp. 1-6.

* cited by examiner

START TIRE PHYSICAL
INFORMATION PROCESS

S1

ACQUIRE TIME SERIES DATA OF SENSOR

S2

EXTRACT FROM INPUT DATA

S3

EXTRACT FEATURE AMOUNT

S4

PERFORM FULL-CONNECTED OPERATIONS

S5

PERFORM OPERATION INVERSE TO
NORMALIZATION

END

| MAE (PROPORTION) | Fx | Fy | Fz |
|---|---|---|---|
| RELATED-ART MODEL | 100 | 100 | 100 |
| MULTITASK MODEL | 101 | 105 | 102 |

*PROPORTION DETERMINED WHEN IT IS GIVEN RELATED-ART MODEL IS 100

TIRE PHYSICAL INFORMATION ESTIMATION SYSTEM AND ARITHMETIC OPERATION MODEL GENERATION SYSTEM

CROSS-REFERENCE TO RELATED APPLICATION

This application is based upon and claims the benefit of priority from the prior Japanese Patent Application No. 2021-170879, filed on Oct. 19, 2021, the entire contents of which are incorporated herein by reference.

BACKGROUND OF THE INVENTION

1. Field of the Invention

The present invention relates to a tire physical information estimation system and an arithmetic operation model generation system.

2. Description of the Related Art

Recently, studies have been conducted on systems configured to input information measured in a tire, a vehicle, etc. to a learning type arithmetic operation model to estimate tire physical information such as a tire force.

Patent literature 1 discloses a tire physical information estimation system according to the related art. The tire physical information estimation system includes a physical information estimation unit and a data acquisition unit. The physical information estimation unit includes a learning type arithmetic operation model including an input layer through an output layer for estimation of physical information related to a tire produced in association with the movement of the tire. The data acquisition unit acquires input data input to the input layer. The arithmetic operation model includes a feature extraction unit that performs a convolution operation in an operation halfway between the input layer and the output layer to extract a feature amount.

[Patent literature 1] Japanese Patent Application Publication No. 2021-46080

SUMMARY OF THE INVENTION

When a system with a small scale of arithmetic operation is built by using the tire physical information estimation system disclosed in patent literature 1, the estimation precision might become poor even if the real time performance of estimation is secured. We have come to realize that the technology disclosed in patent literature 1 leaves a room for improvement in terms of increasing the precision of estimation of tire physical information based on a learning type arithmetic operation model.

The present invention addresses the aforementioned issue and a purpose thereof is to provide a tire physical information estimation system and an arithmetic operation model generation system capable of estimating physical information related to a tire with a high precision.

An embodiment of the present invention relates to a tire physical information estimation system. The tire physical information estimation system includes: a physical information estimation unit that includes a learning type arithmetic operation model including an input layer through an output layer and estimates tire physical information produced in association with movement of a tire; and a data acquisition unit that acquires input data input to the input layer, wherein the arithmetic operation model includes a feature extraction unit that performs a convolution operation in an operation halfway between the input layer and the output layer, the arithmetic operation model outputting normalized tire physical information in at least two axial directions from the output layer.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIGS. 7A, 7B and 7C are graphs showing the correlation between estimated values and measured values found when a learning model according to a comparative example is used;

FIG. 8 shows mean absolute errors of estimated values and measured values; and

DETAILED DESCRIPTION OF THE INVENTION

Figure 1:
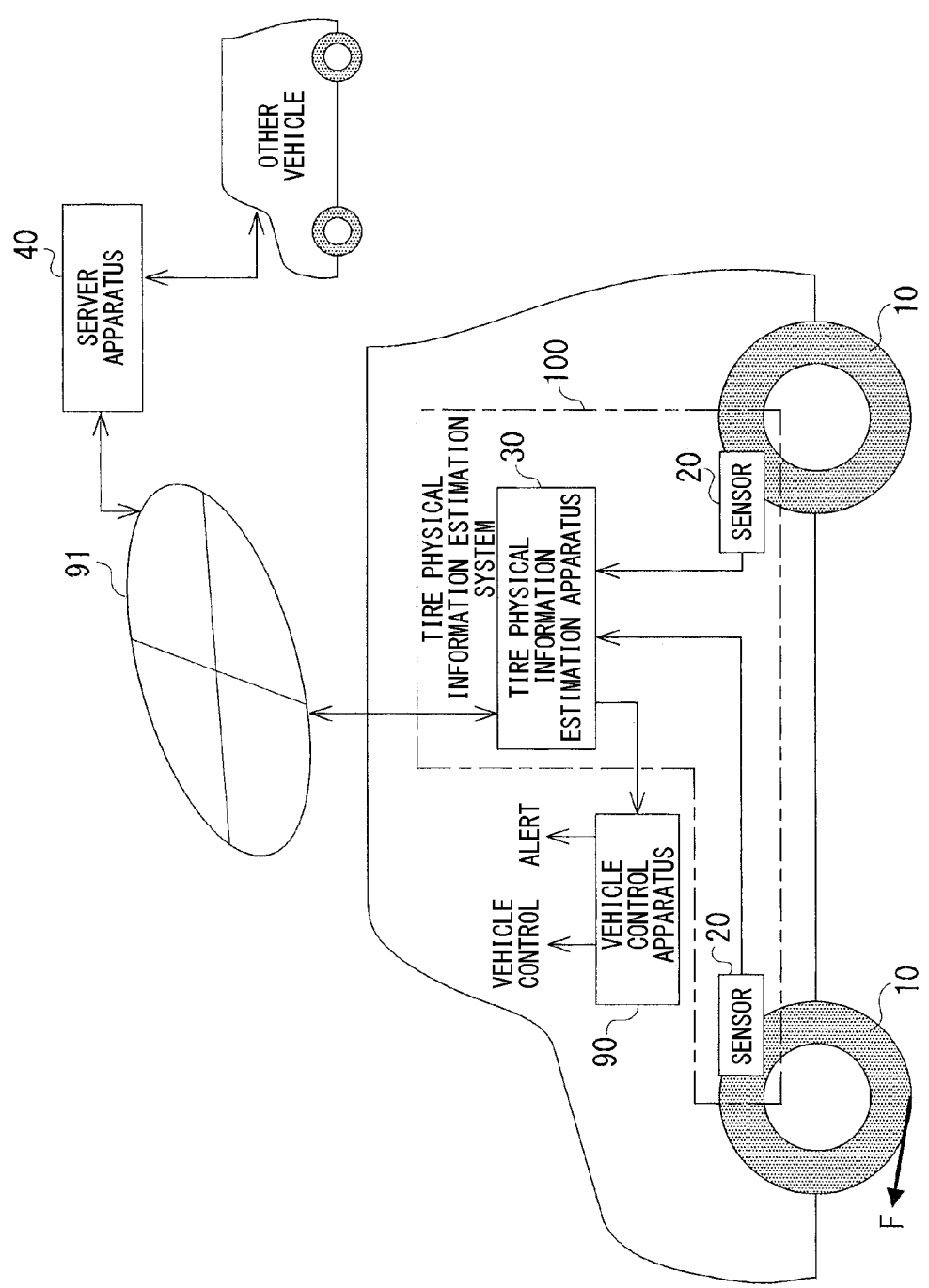
FIG. 1 is a schematic diagram showing an outline of a tire physical information estimation system according to an embodiment.

The invention will now be described by reference to the preferred embodiments. This does not intend to limit the scope of the present invention, but to exemplify the invention.

Hereinafter, the invention will be described based on a preferred embodiment with reference to FIGS. 1 through 9. Identical or like constituting elements and members shown in the drawings are represented by identical symbols and a duplicate description will be omitted as appropriate. The dimension of members in the drawings shall be enlarged or reduced as appropriate to facilitate understanding. Those of the members that are not important in describing the embodiment are omitted from the drawings.

Embodiment

FIG. 1 is a schematic diagram showing an outline of a tire physical information estimation system 100 according to an embodiment. The tire physical information estimation system 100 includes a sensor 20 provided in a tire 10 and a tire physical information estimation apparatus 30. Further, the tire physical information estimation system 100 may include a server apparatus 40 that acquires and collects, via a communication network 91, the tire physical information such as the tire force F, the coefficient of friction on the road surface, and the moment around three axes produced in the tire 10 estimated by the tire physical information estimation apparatus 30.

The sensor 20 measures the physical quantity of the tire 10 such as the acceleration and strain, tire inflation pressure, and tire temperature of the tire 10 and outputs the measured data to the tire physical information estimation apparatus 30. The tire physical information estimation apparatus 30 estimates the tire physical information based on the data measured by the sensor 20. The tire physical information estimation apparatus 30 uses the data measured by the sensor 20 for the operation to estimate the tire physical information but may acquire, from a vehicle control apparatus 90, etc., information such as the vehicle acceleration from the vehicle side and use the information for the operation to estimate the tire physical information.

The tire physical information estimation apparatus 30 outputs the estimated tire physical information such as the tire force F, the coefficient of friction on the road surface, the moment around three axes produced in the tire 10 to, for example, the vehicle control apparatus 90. The vehicle control apparatus 90 uses the tire physical information input from the tire physical information estimation apparatus 30 for, for example, estimation of braking distance, application to vehicle control, and notification of the driver of information related to the safe driving of the vehicle. The vehicle control apparatus 90 can also use map information, weather information, etc. to provide information related to the future safe driving of the vehicle. In the case the vehicle control apparatus 90 has a function of driving the vehicle automatically, the tire physical information estimation system 100 provides the estimated tire physical information to the vehicle control apparatus 90 as data used for vehicle speed control, etc. in automatic driving.

Figure 2:
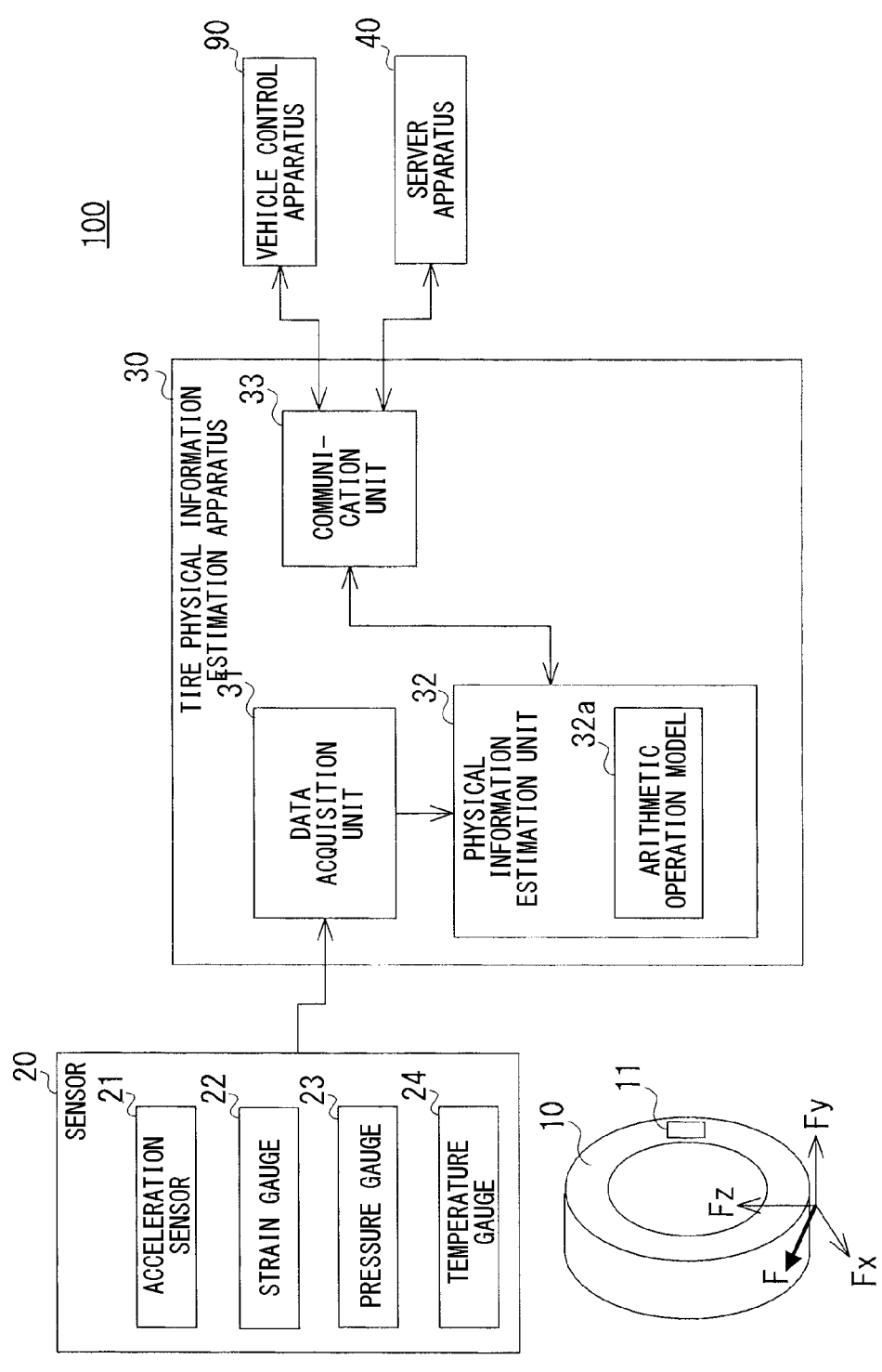
FIG. 2 is a block diagram showing a functional configuration of the tire physical information estimation system according to the embodiment.

FIG. 2 is a block diagram showing a functional configuration of the tire physical information estimation system 100 according to the embodiment. The sensor 20 of the tire physical information estimation system 100 includes an acceleration sensor 21, a strain gauge 22, a pressure gauge 23, a temperature sensor 24, etc. and measures the physical quantity of the tire 10. These sensors measure, as the physical quantity of the tire 10, the physical quantity related to the deformation and movement of the tire 10.

The acceleration sensor 21 and the strain gauge 22 move mechanically along with the tire 10 and measure the acceleration and amount of strain produced in the tire 10, respectively. The acceleration sensor 21 is provided in, for example, the tread, side, and bead of the tire 10, in the wheel, etc. and measures the acceleration in the three axes, i.e., the circumferential, axial, and radial directions of the tire 10.

The strain gauge 22 is provided in the tread, side, bead, etc. of the tire 10 and measures the strain at the location of provision. Further, the pressure gauge 23 and the temperature sensor 24 are provided in, for example, the air valve of the tire 10 and measure the tire inflation pressure and tire temperature, respectively. The temperature sensor 24 may be provided directly in the tire 10 to measure the temperature of the tire 10 accurately. An RFID 11, etc. to which unique identification information is assigned may be attached to the tire 10 to identify each tire.

The tire physical information estimation apparatus 30 includes a data acquisition unit 31, a physical information estimation unit 32, and a communication unit 33. The tire physical information estimation apparatus 30 is an information processing apparatus such as a personal computer (PC). The units in the tire physical information estimation apparatus 30 can be realized in hardware by an electronic element such as a CPU of a computer, a mechanical component or the like, and in software by a computer program or the like. Functional blocks realized through collaboration among them are depicted here. Accordingly, those skilled in the art will understand that these functional blocks can be realized in various forms by a combination of hardware and software. The data acquisition unit 31 corresponds to a data acquisitor in the present invention. The physical information estimation unit 32 corresponds to a physical information estimator in the present invention.

The data acquisition unit 31 acquires, by wireless communication, etc., information on the acceleration, strain, inflation pressure, and temperature measured by the sensor 20. The communication unit 33 communicates with an external apparatus such as the vehicle control apparatus 90 and the server apparatus 40 by wire or wirelessly. The communication unit 33 transmits the physical quantity of the tire 10 measured by the sensor 20 and the tire physical information etc. estimated for the tire 10, etc. to the external apparatus via a communication line (e.g., a control area network (CAN)), the Internet, etc.).

The physical information estimation unit 32 includes an arithmetic operation model 32a, inputs the information from the data acquisition unit 31 to the arithmetic operation model 32a, and estimates the tire physical information such as the tire force F, the coefficient of friction on the road surface, and the moment around three axes produced in the tire 10. As shown in FIG. 2, the tire force F has components in the three axial directions, i.e., a longitudinal force Fx in the longitudinal direction of the tire 10, a lateral force Fy in the lateral direction, and a load Fz in the vertical direction. The physical information estimation unit 32 may calculate all of these components in the three axial directions, calculate one of the components, or calculate an arbitrary combination of two components.

Figure 3:
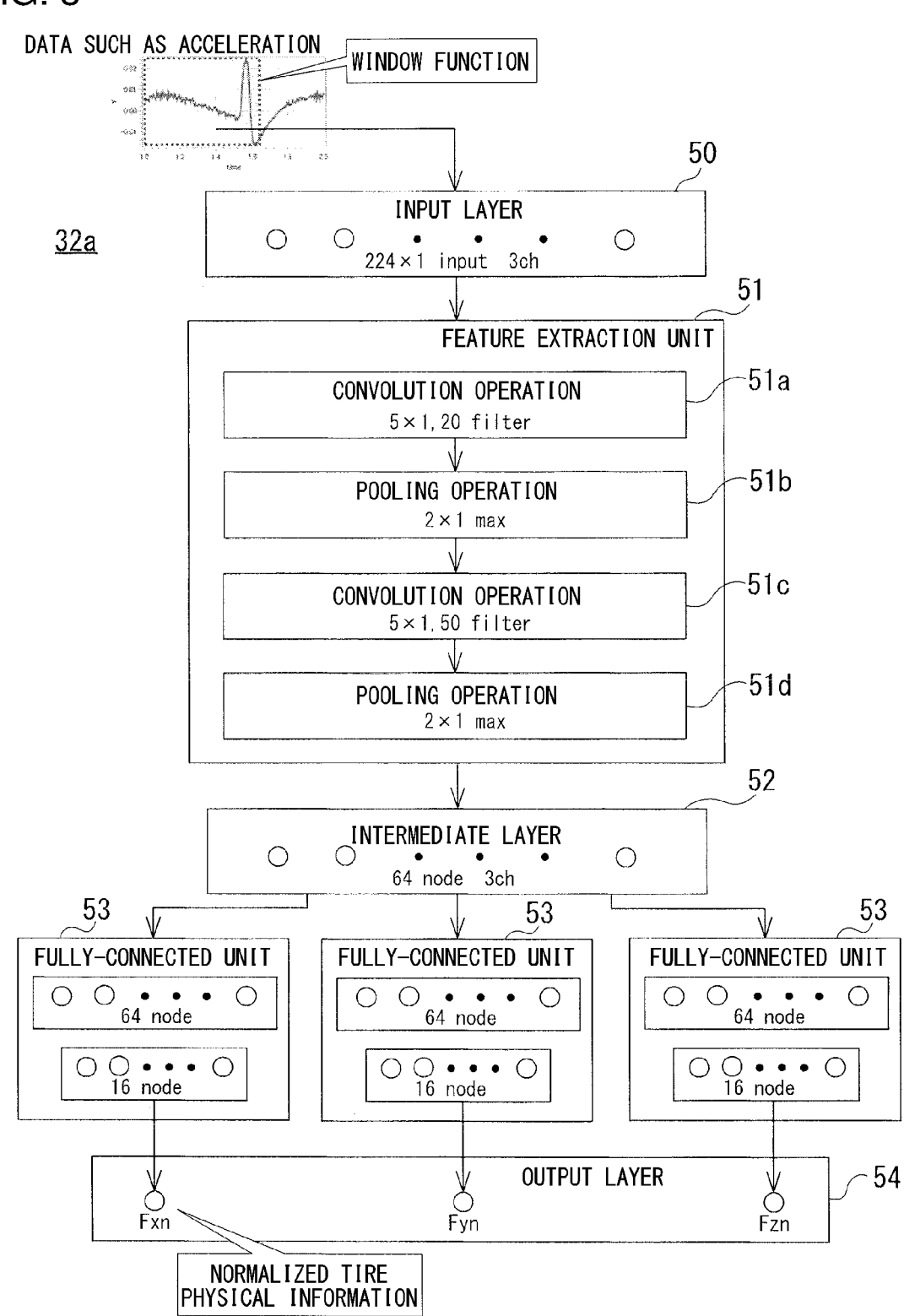
FIG. 3 is a schematic diagram showing a configuration of the arithmetic operation model.

The arithmetic operation model 32a uses a learning type model such as a neural network. FIG. 3 is a schematic diagram showing a configuration of the arithmetic operation model 32a. The arithmetic operation model 32a is of a convolutional neural network (CNN) type and is a learning type model provided with convolution operation and pooling operation used in the so-called LeNet, which is a prototype of CNN. FIG. 3 shows an example in which acceleration data in the three axial directions is used as input data input to the arithmetic operation model 32a, and the normalized tire force in the three axial directions is output.

The arithmetic operation model 32a includes an input layer 50, a feature extraction unit 51, an intermediate layer 52, a fully-connected unit 53, and an output layer 54. The arithmetic operation model 32a is configured as a multitask type in which the feature extraction unit 51 is used commonly for the three axial directions, and the fully-connected unit 53 is provided for each of the three axial directions. The output layer 54 outputs the normalized values of the tire forces Fx, Fy, and Fz in the three axial directions. The normalized tire forces in the three axial directions output from the output layer 54 are denoted by Fxn, Fyn, and Fzn. The feature extraction unit 51 corresponds to a feature extractor in the present invention.

Given that each of the tire forces Fx and FY generated while the vehicle is being driven is −5000 N or greater and 5000 N or smaller, for example, the normalized tire forces Fxn and Fyn output from the output layer 54 are defined as values derived by dividing the tire forces Fx and Fy by a constant value 5000. This causes the normalized tire forces Fxn and Fyn to vary in a range of −1 or greater and 1 or smaller.

Given that the tire force Fz generated while the vehicle is being driven is 2000 N or greater and 8000 N or smaller, for example, the normalized tire force Fzn output from the output layer 54 is defined as a value derived by subtracting 5000, the median value, from the tire force Fz and dividing the resultant value by a constant value 3000. This causes the normalized tire force Fzn to vary in a range of −1 or greater and 1 or smaller.

Normalization of the tire physical information such as the tire force F in the three axial directions, the coefficient of friction on the road surface, and the moment around the three axes produced in the tire 10 may not be performed as described above and could be configured as appropriate in accordance with the property of the tire physical information, the range of values that could be taken, etc.

Time series data for acceleration in the three axial directions acquired by the data acquisition unit 31 is input to the input layer 50. The acceleration data is measured by the sensor 20 in a time-series manner, and data for a predetermined time segment is extracted by a window function for use as the input data. For example, the input data may be 224 items of acceleration data included in a predetermined time segment for each axial direction.

Acceleration measured in the tire 10 exhibits periodicity per rotation of the tire 10. The time segment of input data extracted by the window function may be a period of time corresponding to the period of rotation of the tire 10 to impart the input data itself with a periodicity. The window function may extract input data in a time segment shorter or longer than one rotation of the tire 10. The arithmetic operation model 32a can be trained so long as the extracted input data at least includes periodical information.

The feature extraction unit 51 extracts a feature amount by using a convolution operation 51a and a pooling operation 51b and transmits the feature amount to the nodes of the intermediate layer 52. In the example of the feature extraction unit 51 shown in FIG. 3, 20 filters are used for the input data to perform the first convolution operation. The convolution operation 51a performs the convolution operation by moving the filter relative to the time series input data such as acceleration data. The convolution operation 51a is performed for the acceleration data (the plurality of items of input data) for each of the three axial directions. By using a common filter in the respective axial directions, the scale of arithmetic operation can be reduced.

The filter length in the convolution operation 51a is indicated to be 5 but may be set to be 1-5 as appropriate. The convolution operation is performed such that, of the time series input data, data as long as the continuous filter length (e.g., A1, A2, A3) is multiplied by the values (f1, f2, f3) in the filters, respectively. The values obtained by the multiplication are added up so as to obtain $A1 \times f1 + A2 \times f2 + A3 \times f3$. Zero padding, whereby "0" data is appended to the end of the input data, may be performed to perform the convolution operation. The amount of movement of the filter in the convolution operation is, normally, one item of input data but may be modified as appropriate to reduce the scale of the arithmetic operation model 32a.

In the pooling operation 51b, the data from the first convolution operation is subjected to the first maximum pooling operation. In the pooling operation 51b, the larger of the two values arranged in a time sequence is selected by way of example.

In a second convolution operation 51c, the data from the pooling operation 51b is subjected to a convolution operation by using, for example, 50 filters. The filter length in the convolution operation 51c may be equal to or different from that of the convolution operation 51a. The scale of arithmetic operation can equally be reduced in the convolution operation 51c by using a common filter in the respective axial directions.

In a pooling operation 51d, the data from the convolution operation 51c is subjected to the second maximum pooling operation. In the pooling operation 51d, as in the pooling operation 51b, the larger of the two values arranged in a time sequence is selected by way of example. The feature extraction unit 51 acquires 64 items of data in each axial direction, i.e., acquires 64×3 ch data resulting from the convolution operation and the pooling operation and outputs the data to the nodes in the intermediate layer 52.

For each of the three axial directions, the fully-connected unit 53 fully connects the data from the nodes of the intermediate layer 52 in two layers and outputs the normalized tire forces Fxn, Fyn, and Fzn to the nodes of the output layer 54. The fully-connected unit 53 performs an operation via fully-connected paths on which weighted liner operation, etc. is performed. In addition to a linear operation, the fully-connected unit 53 may perform a non-linear operation by using an activating function, etc.

The physical information estimation unit 32 may restore and estimate the tire forces Fx, Fy, and Fz by subjecting the normalized tire forces Fxn, Fyn, and Fzn output to the output layer 54 to an operation inverse to normalization.

In addition to the normalized tire forces in the three axial directions, the tire physical information such as the coefficient of friction on the road surface and the moment around three axes produced in the tire 10 may be output to the nodes of the output layer 54. The tire physical information such as the coefficient of friction on the road surface and the moment around three axes produced in the tire 10 output to the output layer 54 may be normalized values. Of the tire physical information such as the tire forces in the three axial directions, the coefficient of friction on the road surface, and the moment around three axes produced in the tire 10, the output layer 54 may output one type of tire physical information or an arbitrary combination of plurality of types of tire physical information.

In the estimation of the coefficient of friction on the road surface, the output layer 54 may output an estimated value of the coefficient of friction on the road surface. Alternatively, the coefficient of friction on the road surface may be grouped into a category such as dry, wet, snowy, or frozen, and the output layer 54 may output which category is applicable.

Reference is made back to FIG. 2. The server apparatus 40 acquires, from the tire physical information estimation apparatus 30, the physical quantity of the tire 10 measured by the sensor 20 and the tire physical information such as the tire force F and the coefficient of friction on the road surface estimated for the tire 10. The server apparatus 40 may collect, from a plurality of vehicles, the physical quantity measured in the tire 10, the tire physical information estimated by the tire physical information estimation apparatus 30, etc.

Figure 4:
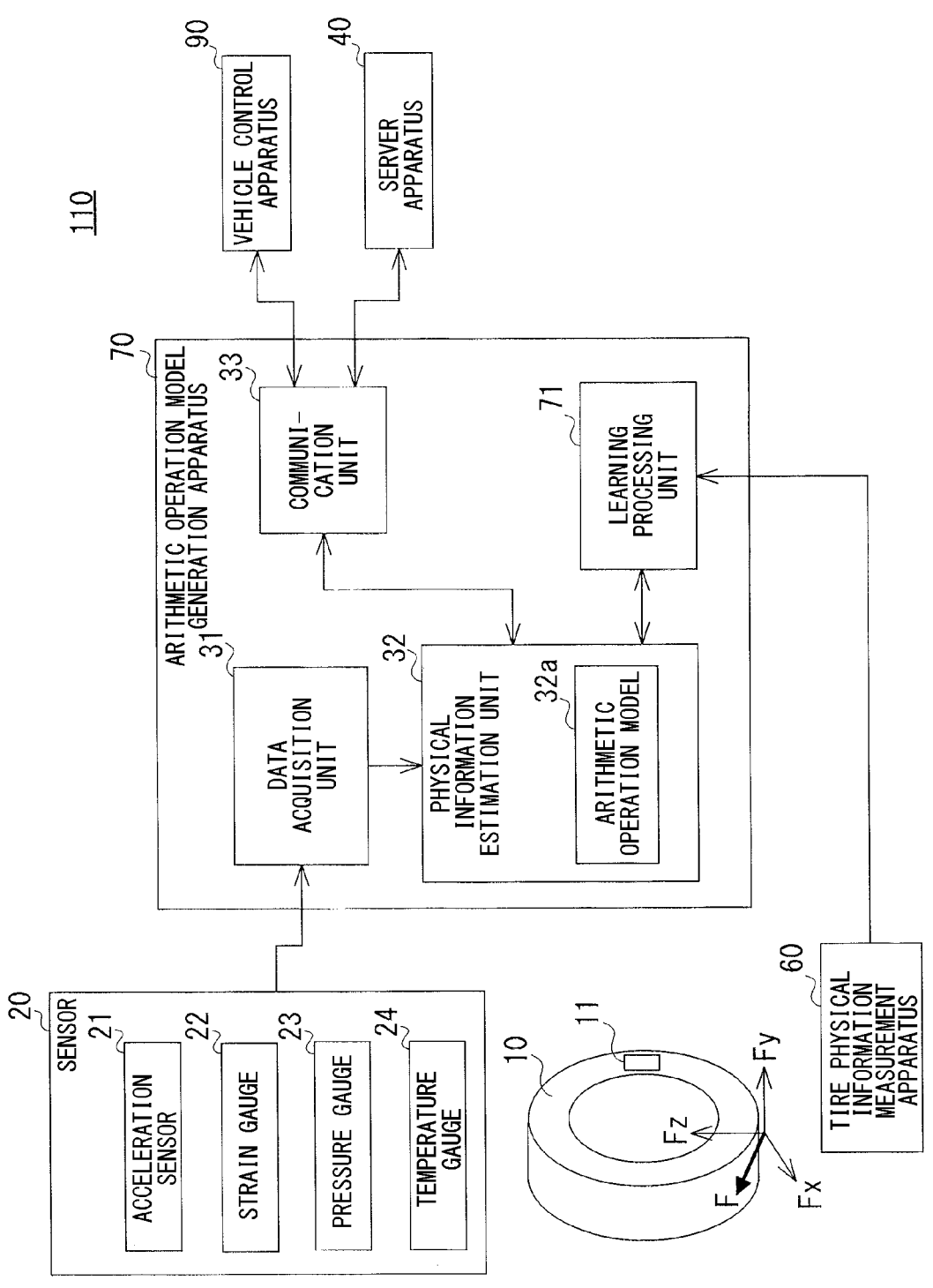
FIG. 4 is a block diagram showing a functional configuration of an arithmetic operation model generation system.

FIG. 4 is a block diagram showing a functional configuration of an arithmetic operation model generation system 110. The arithmetic operation model generation system 110 is provided with a tire physical information measurement apparatus 60 and an arithmetic operation model generation apparatus 70 including a learning processing unit 71. In addition to the features of the tire physical information estimation apparatus 30, the arithmetic operation model generation apparatus 70 includes the learning processing unit 71. Those features of the arithmetic operation model generation apparatus 70 corresponding to the respective features of the tire physical information estimation apparatus 30 have similar functions as those of the tire physical information estimation apparatus 30, but the arithmetic operation model 32a has not been trained or is being trained. The learning processing unit 71 corresponds to a learning processor in the present invention.

The tire physical information measurement apparatus 60 measures the tire physical information such as the tire forces F in the three axial directions, the coefficient of friction on the road surface, and the moment around three axes produced in the tire 10. The learning processing unit 71 uses the normalized version of the tire physical information measured by the tire physical information measurement apparatus 60 as training data to train the arithmetic operation model 32a. In the process of training the arithmetic operation model 32a, the tire physical information is estimated by the arithmetic operation model 32a based on input information, and the estimated data is compared with the training data.

The learning processing unit 71 compares the tire physical information estimated by the arithmetic operation model 32a with the training data and newly sets various coefficients in the arithmetic steps such as weighting in the arithmetic operation model 32a. The arithmetic operation model 32a is trained by repeatedly being updated. The tire physical information estimation system 100 estimates the tire physical information by using the arithmetic operation model 32a that has been trained by the arithmetic operation model generation system 110.

The configuration (e.g., the number of layers) and weighting in the fully-connected unit 53 of the arithmetic operation model 32a may be changed basically in accordance with the specification of the tire 10. The arithmetic operation model 32a can be trained in rotation tests in the tires 10 (including the wheel) with different specifications. It should however be noted that it is not necessary to strictly train the arithmetic operation model 32a for each specification of the tire 10. By training and building the arithmetic operation model 32a for different types (e.g., tires for passenger vehicles, tires for trucks, etc.) to make it possible to estimate the tire force F within a predetermined margin of error, one arithmetic operation model 32a may be shared by the tires 10 encompassed by multiple specifications so that the number of arithmetic operation models is reduced.

The arithmetic operation model 32a may be trained by mounting the tire 10 to an actual vehicle and test driving the vehicle on road surfaces. The specification of the tire 10 includes information related to tire performance such as tire size, tire width, tire profile, tire strength, tire outer diameter, road index, and year/month/date of manufacturing.

The arithmetic operation model 32a may be trained by conducting rotation tests, changing the coefficient of friction on the ground surface touched by the tire 10. Further, the arithmetic operation model 32a may be trained by mounting the tire 10 to an actual vehicle and test driving the vehicle on road surfaces with different coefficients of friction.

Figure 5:
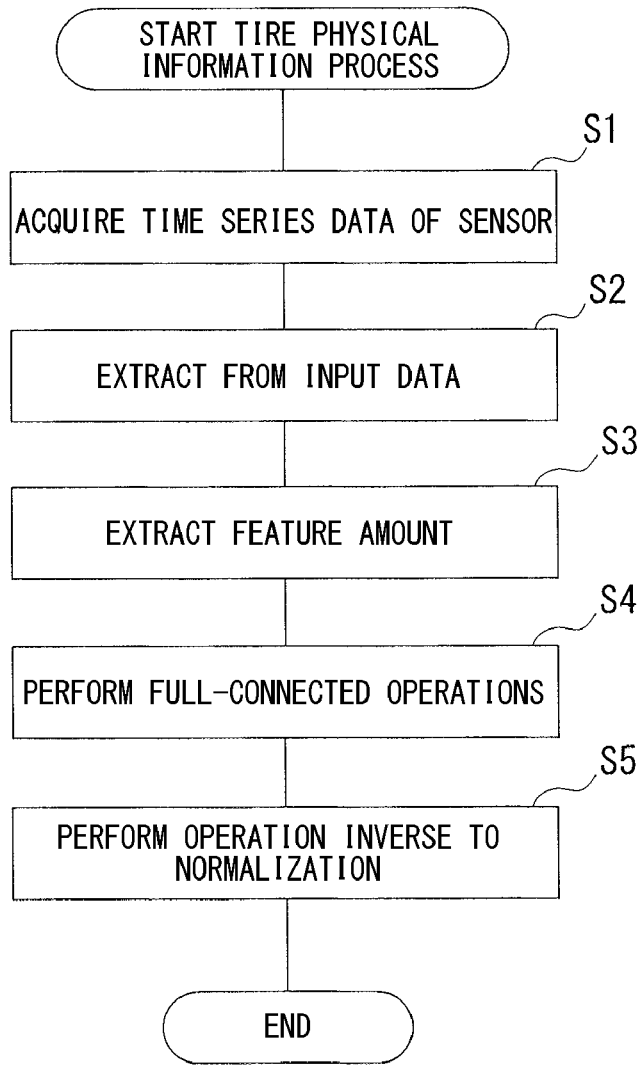
FIG. 5 is a flowchart showing a sequence of steps of the tire physical information estimation process performed by the tire physical information estimation apparatus.

A description will now be given of the operation of the tire physical information estimation system 100. FIG. 5 is a flowchart showing a sequence of steps of the tire physical information estimation process performed by the tire physical information estimation apparatus 30. The tire physical information estimation apparatus 30 acquires the physical quantity such as the acceleration, strain, tire inflation pressure, and tire temperature of the tire 10 measured by the sensor 20 (S1).

The physical information estimation unit 32 extracts input data in a predetermined time segment from the data acquired by the data acquisition unit 31 (S2). For estimation of tire physical information, acceleration data for at least one axis (e.g., the circumferential direction) is necessary as input data. Further, acceleration data for two axes, i.e., the circumferential direction and axial direction of the tire 10, may be used as input data, or acceleration data for three axes may be used as input data for estimation of tire physical information. Further, the time series data for at least one of the strain, tire inflation pressure, tire temperature of the tire 10 may be included in the input data.

The feature extraction unit 51 of the arithmetic operation model 32a performs a process of extracting the feature amount by the convolution operation and the pooling operation on the input data (S3). The fully-connected unit 53 of the arithmetic operation model 32a performs a fully-connected operation on the feature amount extracted by the feature extraction unit 51 and input to the nodes of the intermediate layer 52 (S4). Parameters for weighting, etc. used in the fully-connected operation are determined as a result of training the arithmetic operation model 32a. The fully-connected operation outputs, for example, the normalized tire physical information such as the tire force F, the coefficient of friction on the road surface, and the moment around three axes produced in the tire 10 to the nodes of the output layer 54.

The physical information estimation unit 32 estimates the tire physical information by subjecting the normalized tire physical information output to the output layer 54 to an operation inverse to normalization (S5) and terminates the process.

Figure 6A:
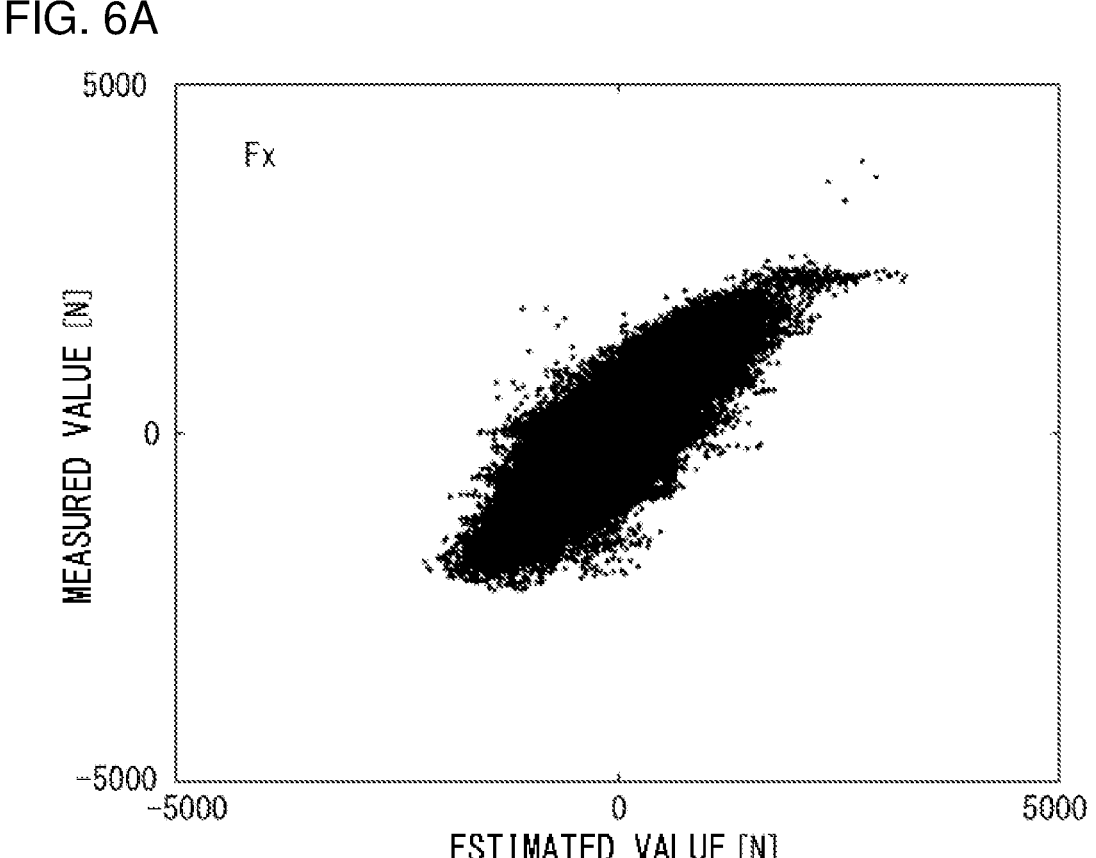
FIGS. 6A, 6B and 6C are graphs showing the correlation between estimated values and measured values found by the tire physical information estimation system.
Figure 6B:
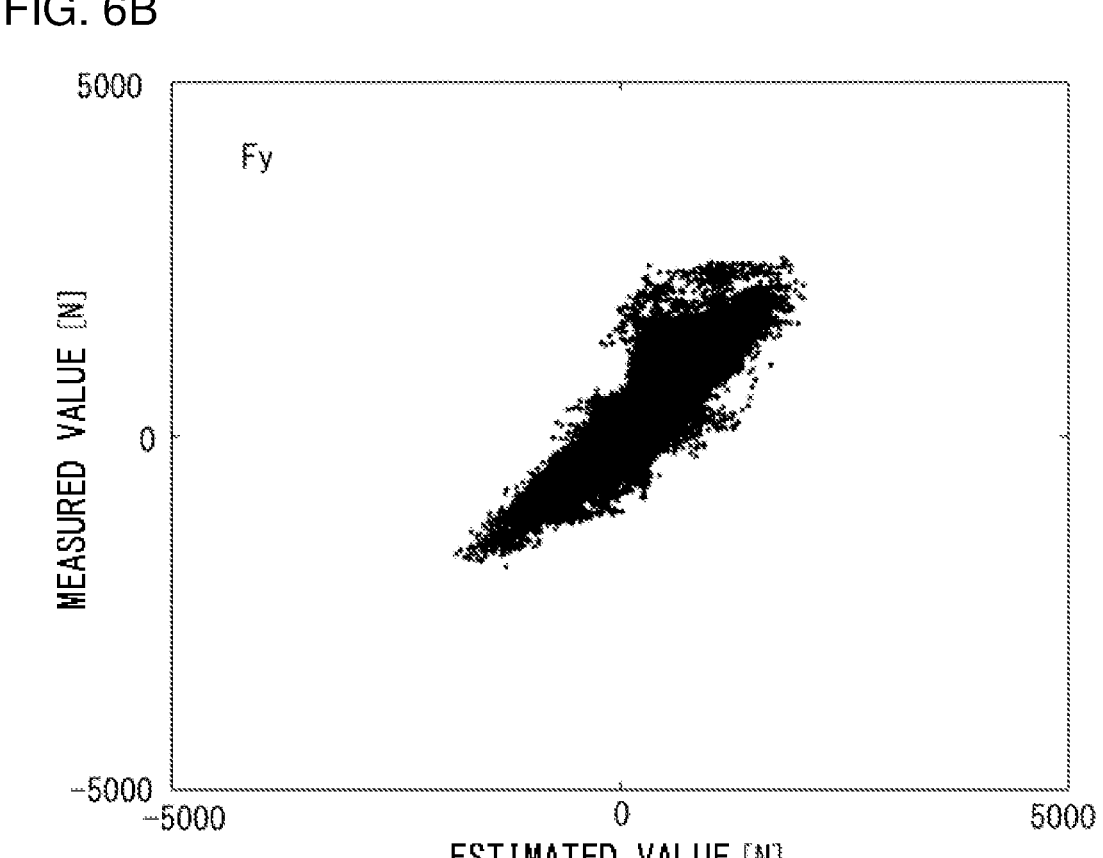
Figure 6C:
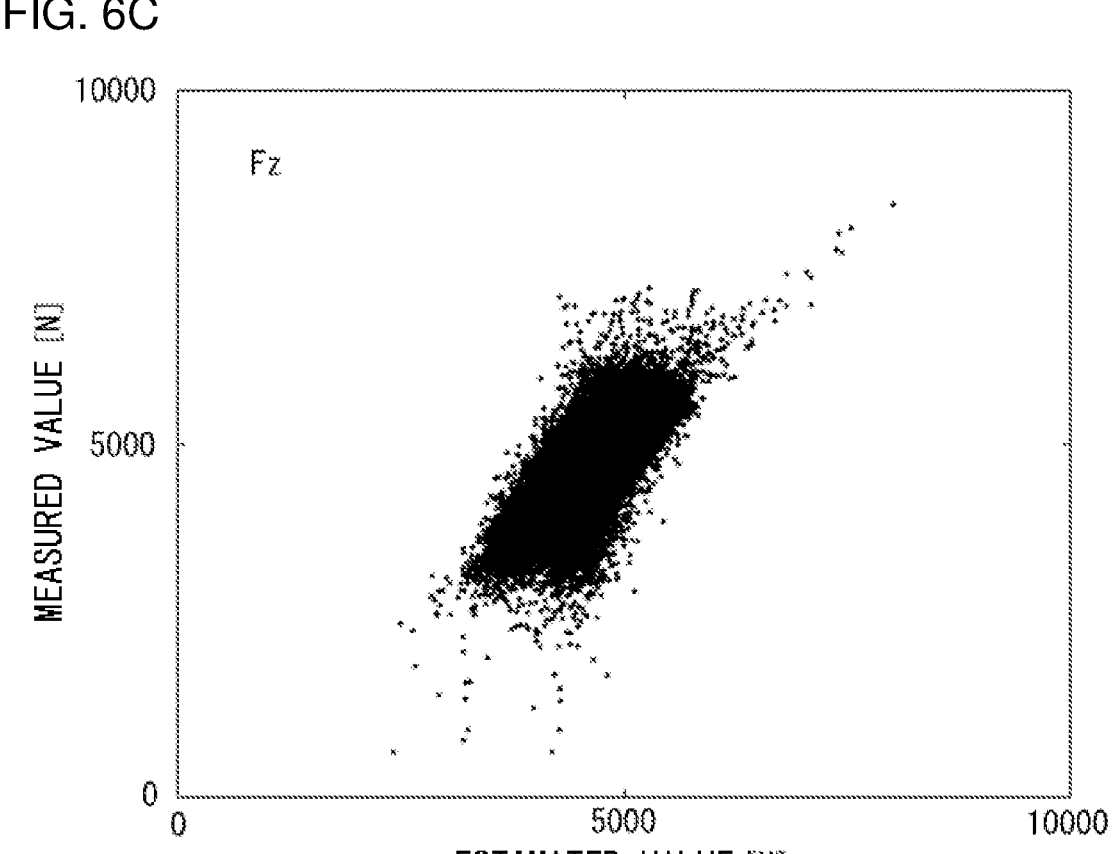

FIGS. 6A, 6B and 6C are graphs showing the correlation between estimated values and measured values found by the tire physical information estimation system 100. FIG. 6A shows the correlation between estimated values and measured values of the tire force Fx, FIG. 6B shows the correlation between estimated values and measured values of the tire force Fy, and FIG. 6C shows the correlation between estimated values and measured values of the tire force Fz.

Figure 7A:
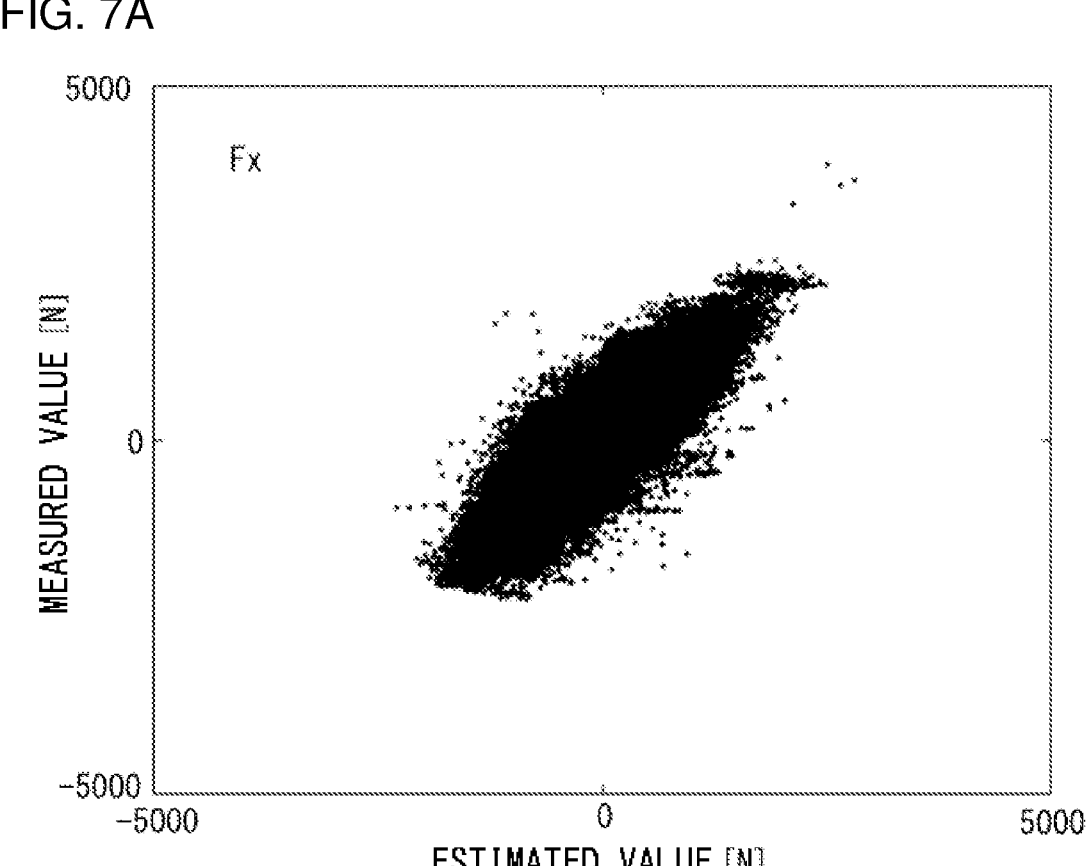
Figure 7B:
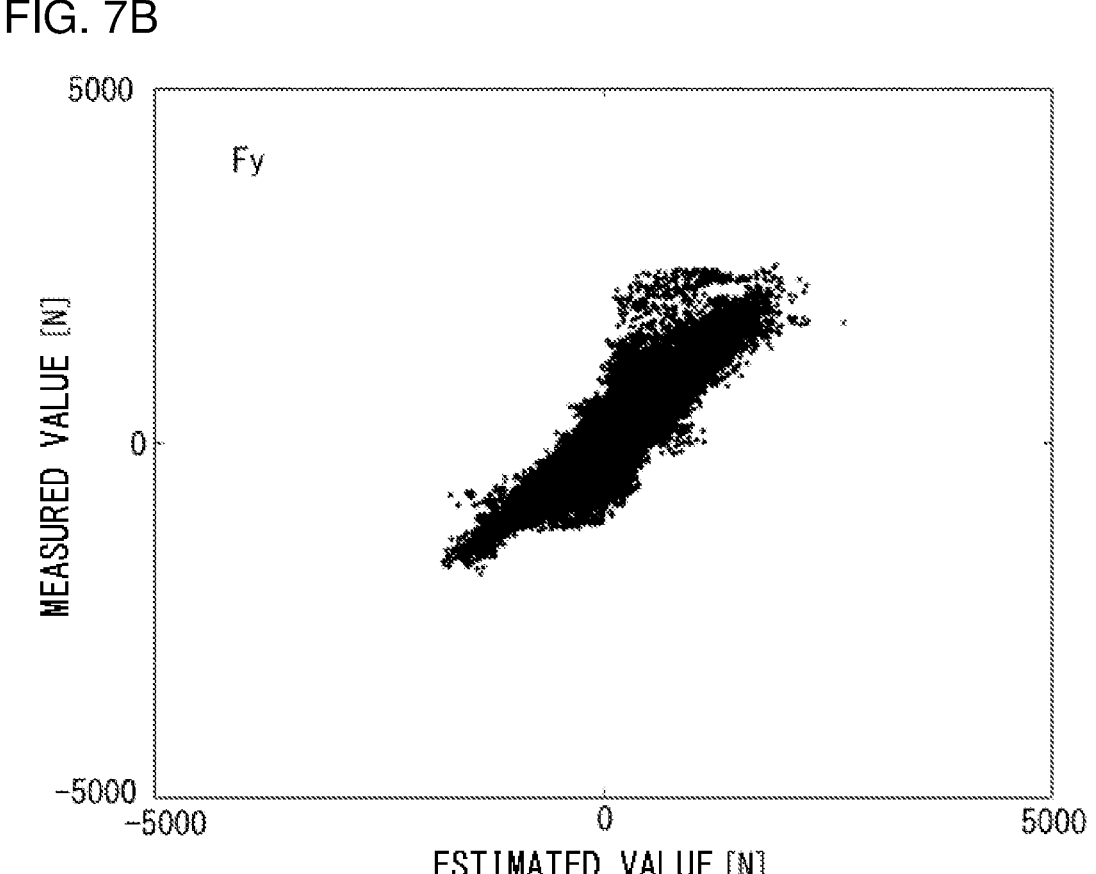
Figure 7C:
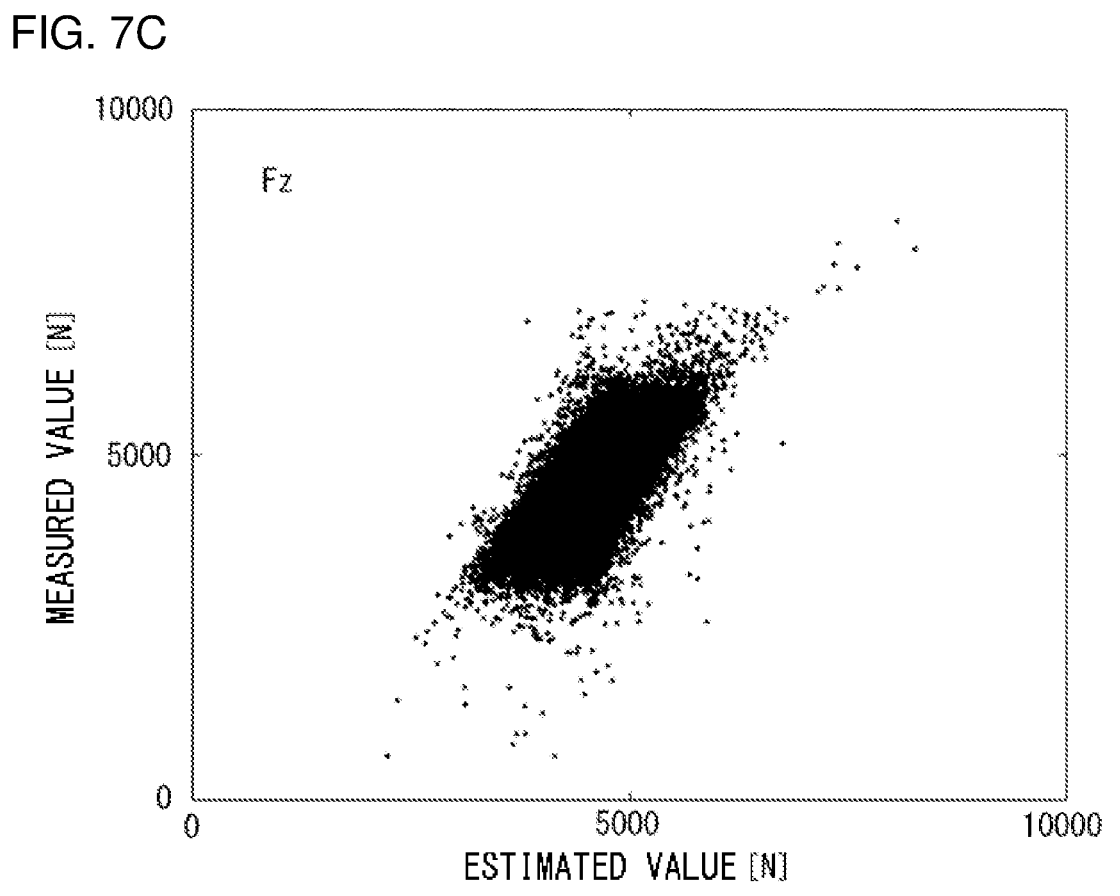

FIGS. 7A, 7B and 7C are graphs showing the correlation between estimated values and measured values found when a learning model according to a comparative example is used. The correlation between estimated values and measured values of the tire forces Fx, Fy, and Fz in the comparative example is respectively shown in FIGS. 7A, 7B, and 7C. In the comparative example, a single-task learning model (referred to as "related-art model") is built. The related-art model has a high estimation precision but requires a large scale of arithmetic operation and so is not suitable for mounting in a vehicle.

The correlation of the tire force Fx estimated by the tire physical information estimation system 100 according to the embodiment shown in FIG. 6A shows a distribution substantially identical to the correlation of the tire force Fx according to the comparative example shown in FIG. 7A. A comparison between FIG. 6B and FIG. 7B and a comparison between FIG. 6C and FIG. 7C also reveal that the correlation of the tire forces Fy and Fz estimated by the tire physical information estimation system 100 according to the embodiment shows a distribution substantially identical to the correlation of the tire forces Fy and Fz according to the comparative example, respectively.

FIG. 8 shows mean absolute errors of estimated values and measured values. The mean absolute values of the tire forces Fx, Fy, and Fz are substantially equal in the multitask model of the embodiment and in the related-art model of the comparative example. In other words, it is demonstrated that the estimation precision of the tire force F commensurate with that of the related-art model of the comparative example can be obtained by the multitask learning model of the embodiment in which the output is normalized.

The arithmetic operation model 32a of the tire physical information estimation system 100 can increase the estimation precision of the tire physical information by being configured to output the normalized tire physical information in at least two axial directions from the output layer 54. The arithmetic operation model 32a can ensure that the normalized tire forces vary within similar ranges and increase the estimation precision, by normalizing the tire force Fz in the vertical direction by an arithmetic operation different from that of the tire forces Fx and Fy in the other two axial directions.

The tire physical information estimation system 100 can reduce the scale of arithmetic operation by providing the arithmetic operation model 32a with the fully-connected unit 53 for each of the plurality of items of tire physical information output and configuring the arithmetic operation model 32a as a multitasking system accordingly. The feature extraction unit 51 of the arithmetic operation model 32a is configured to reduce the scale of arithmetic operation by using a filter common to the convolution operations 51a and 51c. Of the tire forces F in the three axial directions, the physical information estimation unit 32 uses the arithmetic operation model 32a to estimate the tire force F in at least two axial directions as tire physical information. Further, the physical information estimation unit 32 can provide information necessary to analyze the behavior of the tire 10 such as slip, by estimating all of the tire forces F in the three axial directions.

The arithmetic operation model generation system 110 can generate the arithmetic operation model 32a having a favorable estimation precision by normalizing the tire physical information measured by the tire physical information measurement apparatus 60 and using the normalized information as training data to train the arithmetic operation model 32a. The learning processing unit 71 of the arithmetic operation model generation system 110 can generate an arithmetic operation model with a reduced scale of arithmetic operation by training the arithmetic operation model 32a configured as a multitasking system.

Variation

Figure 9:
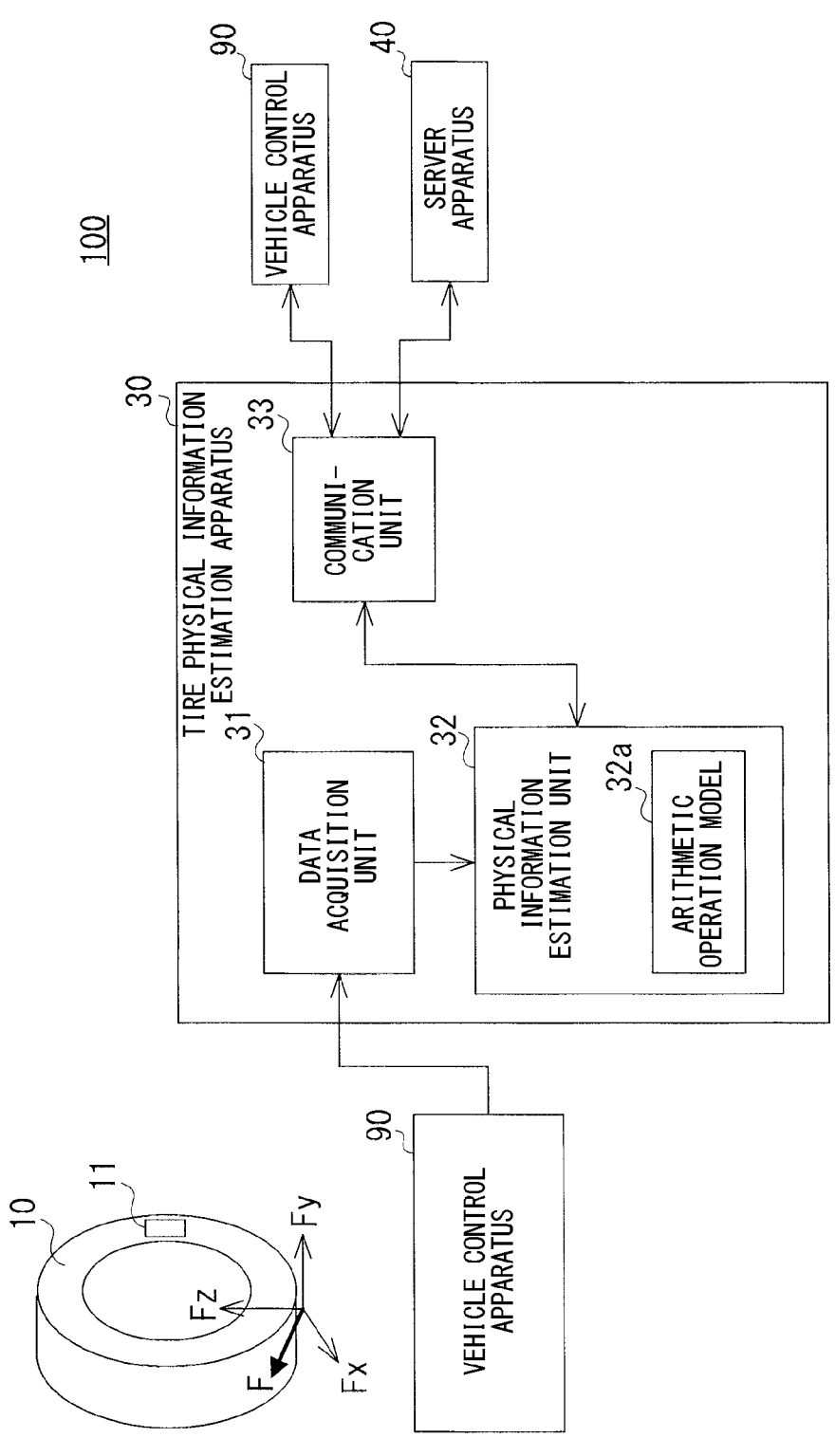
FIG. 9 is a block diagram showing a functional configuration of the tire physical information estimation system according to a variation.

FIG. 9 is a block diagram showing a functional configuration of the tire physical information estimation system 100 according to a variation. In the variation shown in FIG. 9, data input to the arithmetic operation model 32a is acquired from the vehicle control apparatus 90. Data from the vehicle control apparatus 90 and data from the sensor 20 (see FIG. 2) can both be used as data input to the arithmetic operation model 32a.

The vehicle control apparatus 90 acquires, in the digital tachometer etc. of the vehicle, traveling data such as the traveling speed of the vehicle, acceleration in the three axial directions, and triaxial angular speed, and load data such as the weight of the vehicle and axle load applied to the axle shaft. The vehicle control apparatus 90 outputs the traveling data and load data to the tire physical information estimation apparatus 30.

The tire physical information estimation apparatus 30 estimates, by means of the arithmetic operation model 32a, the tire physical information such as the tire force F, the coefficient of friction on the road surface, and the moment around three axes produced in the tire 10 in response to the data input from the vehicle control apparatus 90. The arithmetic operation model 32a is built by, for example, test-driving an actual vehicle to train the arithmetic operation model 32a to learn to estimate the tire physical information in response to the data input from the vehicle control apparatus 90 in advance.

In the embodiment and the variation described above, the tire physical information estimated by the arithmetic operation model 32a is exemplified by the tire force F, the coefficient of friction on the road surface, and the moment around three axes produced in the tire 10. Alternatively, the looseness of a fastening component such as a wheel nut used to mount the tire 10 can be estimated. The vibration due to the looseness of the fastening component such as a wheel nut is reflected in the acceleration data measured in the tire 10, and so the arithmetic operation model 32a of a CNN type for estimating the looseness of the fastening component by way of comparison between tire forces F is built and trained. The tire physical information estimation system 100 can estimate the looseness of the fastening component of the tire 10 in real time by running the operation in the arithmetic operation model 32a based on the input data such as the acceleration data acquired while an actual vehicle is being driven.

Further, the sensor 20 is not limited to the sensors described with reference to FIG. 1, and a microphone provided in the tire 10 or the neighborhood thereof may be used. The arithmetic operation model 32a may estimate the tire physical information by using audio data collected by the microphone.

In the embodiment and the variation described above, the arithmetic operation model 32a of a CNN type built on the LeNet model is used. Alternatively, a model structure such as the Dense Net model, Res Net model, Mobile Net model, and Peleel Net Model may be used. A module structure such as Dense Block, Residual Block, Stem Block, etc. may be incorporated into the arithmetic operation model 32a to build the model.

A description will now be given of the features of the tire physical information estimation system 100 and the arithmetic operation model generation system 110 according to the embodiment. The tire physical information estimation system 100 according to the embodiment includes the physical information estimation unit 32 (physical information estimator) and the data acquisition unit 31 (data acquisitor). The physical information estimation unit 32 includes the learning type arithmetic operation model 32a including the input layer 50 through the output layer 54 and estimates the tire physical information generated in accordance with the movement of the tire 10. The data acquisition unit 31 is operable to acquire the input data input to the input layer 50. The arithmetic operation model 32a includes the feature extraction unit 51 (feature extractor) operable to perform the convolution operations 51a and 51c in the operation halfway between the input layer 50 and the output layer 54, and the arithmetic operation model 32a outputs the normalized tire physical information in at least two axial directions from the output layer 54. This makes it possible for the tire physical information estimation system 100 to increase the estimation precision of the tire physical information such as the tire force F, the coefficient of friction on the road surface, and the moment around three axes produced in the tire 10.

Further, the arithmetic operation model 32a has a plurality of fully-connected units 53 corresponding to the respective axial directions, and the output of the feature extraction unit 51 is input to the plurality of fully-connected units 53. This allows the tire physical information estimation system 100 to reduce the scale of arithmetic operation owing to multitasking in the arithmetic operation model 32a.

Further, the tire physical information comprises tire forces F in the three axial directions. This allows the tire physical information estimation system 100 to provide information necessary to analyze the behavior of the tire 10 such as slip.

Further, the output layer 54 of the arithmetic operation model 32a outputs tire force Fz in the vertical direction normalized by an arithmetic operation different from that of the tire forces Fx and Fy in the other two axial directions. This allows the tire physical information estimation system 100 to ensure that the normalized tire forces vary within similar ranges and to increase the estimation precision.

Further, at least one sensor 20 is provided in the tire 10 and generates time series data, wherein data for a predetermined time segment being extracted by a window function from the time series data generated by the sensor 20 is input to the input layer 50.

Further, the time series data are at least one of acceleration, strain, inflation pressure and temperature of the tire 10.

Further, the predetermined time segment is a period of time corresponding to the period of rotation of the tire 10.

The arithmetic operation model generation system 110 includes the physical information estimation unit 32, the data acquisition unit 31, and the learning processing unit 71 (learning processor). The physical information estimation unit 32 includes the learning type arithmetic operation model 32a including the input layer 50 through the output layer 54 and estimates the tire physical information generated in accordance with movement of the tire 10. The data acquisition unit 31 is operable to acquire the input data input to the input layer 50. The learning processing unit 71 trains the arithmetic operation model 32a based on the training data derived from normalizing the tire physical information measured in the tire 10. The arithmetic operation model 32a includes the feature extraction unit 51 operable to perform the convolution operations 51a and 51c in the operation halfway between the input layer 50 and the output layer 54, and the arithmetic operation model 32a outputs the normalized tire physical information in at least two axial directions from the output layer 54. The allows the arithmetic operation model generation system 110 to generate the arithmetic operation model 32a having a favorable estimation precision.

Described above is an explanation based on an exemplary embodiment. The embodiments are intended to be illustrative only and it will be understood by those skilled in the art that variations and modifications are possible within the claim scope of the present invention and that such variations and modifications are also within the claim scope of the present invention. Therefore, the description in this specification and the drawings shall be treated to serve illustrative purposes and shall not limit the scope of the invention.

What is claimed is:

1. A tire physical information estimation system, comprising:

a physical information estimator that includes a learning type arithmetic operation model based on a neural network including an input layer through an output layer and estimates tire physical information generated in accordance with movement of a tire;

a data acquisitor configured to acquire input data input to the input layer; and a vehicle control device that uses the tire physical information estimated by the physical information estimator for at least one of estimation of braking distance, application to vehicle control, and notification of the driver of information related to the safe driving of the vehicle, wherein the arithmetic operation model includes a feature extractor configured to perform a convolution operation to the data input to the input layer, the arithmetic operation model outputting normalized tire physical information from the output layer, and the tire physical information is a tire force in each of three axial directions among longitudinal, lateral and vertical directions, wherein the arithmetic operation model includes a plurality of fully-connected units corresponding to respective axial directions and inputs an output of the feature extractor to the plurality of fully-connected units, and wherein the output layer outputs the normalized tire forces in longitudinal and lateral directions defined as values of divided by a constant value, and the normalized tire force in vertical direction defined as a value of divided by a constant value after subtracted by a median value.

2. The tire physical information estimation system according to claim 1, further comprising:

at least one sensor is provided in the tire and generates time series data, wherein data for a predetermined time segment being extracted by a window function from the time series data generated by the sensor is input to the input layer.

3. The tire physical information estimation system according to claim 2, wherein the time series data are at least one of acceleration, strain, inflation pressure and temperature of the tire.

4. The tire physical information estimation system according to claim 2, wherein the predetermined time segment is a period of time corresponding to the period of rotation of the tire.

5. An arithmetic operation model generation system comprising:

a physical information estimator that includes a learning type arithmetic operation model based on a neural network including an input layer through an output layer and estimates tire physical information generated in accordance with movement of a tire;

a data acquisitor configured to acquire input data input to the input layer;

a learning processor that trains the arithmetic operation model based on training data derived from normalizing the tire physical information measured in the tire; and a vehicle control device that uses the tire physical information estimated by the physical information estimator for at least one of estimation of braking distance, application to vehicle control, and notification of the driver of information related to the safe driving of the vehicle, wherein the arithmetic operation model includes a feature extractor configured to perform a convolution operation to the data input to the input layer and the output layer, the arithmetic operation model outputting normalized tire physical information from the output layer, and the tire physical information is a tire force in each of three axial directions among longitudinal, lateral and vertical directions, wherein the arithmetic operation model includes a plurality of fully-connected units corresponding to respective axial directions and inputs an output of the feature extractor to the plurality of fully-connected units, and wherein the output layer outputs the normalized tire
forces in longitudinal and lateral directions defined as
values of divided by a constant value, and the normal-
ized tire force in vertical direction defined as a value of
divided by a constant value after subtracted by a
median value.

* * * * *